United States Patent
Kim

(10) Patent No.: US 7,098,919 B2
(45) Date of Patent: Aug. 29, 2006

(54) ALPHABETIC CHARACTER INPUTTING DEVICE AND METHOD FOR RECOGNIZING INPUTTED CHARACTERS

(75) Inventor: Hyo-Jin Kim, Gwangju (KR)

(73) Assignee: Samsung Electronics Co., Ltd., (KR)

( * ) Notice: Subject to any disclaimer, the term of this patent is extended or adjusted under 35 U.S.C. 154(b) by 130 days.

(21) Appl. No.: 10/948,817

(22) Filed: Sep. 23, 2004

(65) Prior Publication Data

US 2005/0068323 A1    Mar. 31, 2005

(30) Foreign Application Priority Data

Sep. 25, 2003    (KR) ...................... 10-2003-0066619

(51) Int. Cl.
*G06T 11/00* (2006.01)
*G06T 11/60* (2006.01)

(52) U.S. Cl. ................. 345/467; 345/629; 434/160

(58) Field of Classification Search ................ 345/467, 345/629; 434/160
See application file for complete search history.

(56) References Cited

U.S. PATENT DOCUMENTS 5,407,355 A  *  4/1995  Majzub ....................... 434/160

FOREIGN PATENT DOCUMENTS

KR           990055053           12/1999

* cited by examiner

*Primary Examiner*—Almis Jankus
(74) *Attorney, Agent, or Firm*—Dilworth & Barrese LLP

(57) ABSTRACT

Disclosed is an alphabetic character input device which includes a key input section composed of a first key group having input keys mapped with first half patterns of certain alphabetic characters which are divided into a pair of half patterns and a second key group having input keys mapped with second half patterns of said certain alphabetic characters, the other undivided alphabetic characters being mapped on the input keys of either the first key group or the second key group; a memory for storing a table that maps the input keys of the first and second key groups with the first and second half patterns of said certain alphabetic characters and said other alphabetic characters; and a control section that recognizes a key mapped with the alphabetic character is pressed and combines a first half pattern with a second half pattern when keys mapped with first second half patterns are pressed in sequence, thereby recognizing the combined patterns as a single alphabetic character. An alphabetic character can be inputted by one or two keystrokes. Certain alphabetic character are each divided into a pair of half patterns, i.e., a first half pattern and a second half pattern, which are intuitively associated with a complete alphabetic character. Thus, the character input device enables the user to easily and rapidly input alphabetic characters with fewer keystrokes.

6 Claims, 7 Drawing Sheets

| CHARACTER | INPUT ORDER |
|---|---|
| A | ② |
| B | ② → ② |
| C | ② → ② → ② |
| D | ③ |
| E | ③ → ③ |
| F | ③ → ③ → ③ |
| G | ④ |
| H | ④ → ④ |
| I | ④ → ④ → ④ |
| J | ⑤ |
| K | ⑤ → ⑤ |
| L | ⑤ → ⑤ → ⑤ |
| M | ⑥ |
| N | ⑥ → ⑥ |
| O | ⑥ → ⑥ → ⑥ |
| P | ⑦ |
| Q | ① |
| R | ⑦ → ⑦ |
| S | ⑦ → ⑦ → ⑦ |
| T | ⑧ |
| U | ⑧ → ⑧ |
| V | ⑧ → ⑧ → ⑧ |
| W | ⑨ |
| X | ⑨ → ⑨ |
| Y | ⑨ → ⑨ → ⑨ |
| Z | ① |

FIG.2
(PRIOR ART)

| O ∧ ① | P ㄱ ② | C ㅏ ③ |
| I / ④ | F ㅏ ⑤ | U ㅡ ⑥ |
| V ⑦ | N ⑧ | Space ⑨ |
| J⊃V　★ | ㅡㄱ ⓪ | l \ # |

FIG.5

| CHARACTER | COMBINATION | INPUT ORDER |
|---|---|---|
| A | ∧ + ─ | ① → ⓞ |
| B | P + ⊃ | ② → ★ |
| C | C | ③ |
| D | I + ⊃ | ④ → ★ |
| E | F + ─ | ⑤ → ⓞ |
| F | F | ⑤ |
| G | C + ┐ | ③ → ⓞ |
| H | ├ + I | ⑤ → # |
| I | I | ④ |
| J | ─ + U | ⑥ → ★ |
| K | ┝ + \ | ③ → # |
| L | I + ─ | ④ → ⓞ |
| M | N + \ | ⑧ → # |
| N | N | ⑧ |
| O | O | ① |
| P | P | ② |
| Q | O + \ | ① → # |
| R | P + \ | ② → # |
| S | C + ⊃ | ③ → ★ |
| T | ─ + I | ⑥ → # |
| U | U | ⑥ |
| V | V | ⑦ |
| W | V + V | ⑦ → ★ |
| X | / + \ | ④ → # |
| Y | V + I | ⑦ → # |
| Z | ⋗ + ─ | ② → ⓞ |

FIG.6

ALPHABETIC CHARACTER INPUTTING DEVICE AND METHOD FOR RECOGNIZING INPUTTED CHARACTERS

PRIORITY

This application claims priority to an application entitled "Alphabetic Character Inputting Device and Method for Recognizing Inputted Characters" filed with the Korean Intellectual Property Office on Sep. 25, 2003 and assigned Serial No. 2003-66619, the contents of which are hereby incorporated by reference.

BACKGROUND OF THE INVENTION

1. Field of the Invention

The present invention relates to an alphabetic character inputting device and a method for recognizing inputted alphabetic characters, and more particularly to a device for inputting a single alphabetic character by a combination of two half patterns and a method for recognizing an inputted alphabetic character.

2. Description of the Related Art

Generally, a communication terminal, such as a telephone or a facsimile, includes a program for recognizing characters input via number keys which are also assigned with alphabetic characters.

For example, a mobile communication terminal will assign, or map, three alphabetic characters to a single number key. As shown in FIG. 1, a mobile communication terminal has a key input section with ten number keys. As shown, each of the keys numbered 1 to 9 is mapped with a plurality of alphabetic characters. FIG. 2 is a table showing specific characters mapped on each key and the input order for recognition of input of each alphabetic character.

Referring to FIGS. 1 and 2, number key 2 is mapped with alphabetic characters A, B and C. Number key 3 is mapped with alphabetic characters E, F and G. Number keys 4 to 9 are similarly each mapped with three alphabetic characters. As shown in FIG. 2, a user can input alphabetic character (i.e. letter) "A" by pressing the number key 2 once. In order to input "B" or "C," the user must press the same number key 2 twice or three times, respectively. Similar to the need for the user to press the number key three times to input the letter "C", in order to input "F," "I," "L," "O," "S," "V" or "Y," the user must press the corresponding number key three times.

In a conventional mobile communication terminal that maps a plurality of alphabetic characters on a single key, the user can input an alphabetic character by pressing the corresponding key from one to three times, typically according to the order in which the character is imprinted on each key. In order to consecutively input two characters which are both mapped on the same key, the user has to wait a predetermined period of time, e.g. one second, after completing the input of the first character before the user can start to input the next character.

In order to solve the problems with the conventional mobile terminal, a character input device has been conceived to extract basic patterns from the shape of each alphabetic character from A to Z and to form an alphabetic character by combining a pair of basic patterns thereof. Such conventional devices, however, are limited in that they provide a key input section having only basic patterns imprinted thereon, to allow a user to input any alphabetic character with less keystrokes.

However, these conventional character input devices use basic patterns which are not extracted exactly from the shape of each alphabetic character and are merely similar in shape to each alphabetic character. Therefore, it is difficult for users to intuitively associate basic patterns with corresponding alphabetic characters. In addition, such conventional methods always require a two-keystroke sequence to input a single alphabetic character by a combination of two basic patterns.

SUMMARY OF THE INVENTION

Accordingly, the present invention has been made to solve the above-mentioned problems occurring in the prior art. One object of the present invention is to provide a device and a method for inputting an alphabetic character by one or two keystrokes.

Another object of the present invention is to provide a device and a method for rapidly inputting an alphabetic character by a entering a pair of half patterns, i.e., a first half pattern and a second half pattern, which are derived from the shape of the alphabetic character and intuitively associated with the alphabetic character, and recognizing the inputted alphabetic character.

In accordance with a first aspect of the present invention for achieving the above objects, there is provided a character input device comprising: a key input section composed of a first key group having input keys mapped with first half patterns of certain alphabetic characters which are each divided into a pair of half patterns and a second key group having input keys mapped with second half patterns of said certain alphabetic characters, the other undivided alphabetic characters being mapped on the input keys of either the first key group or the second key group; a memory for storing a table that maps the input keys of the first and second key groups with the first and second half patterns of said certain alphabetic characters and said other alphabetic characters; and a control section for recognizing an input of an alphabetic character when a key mapped with the alphabetic character is pressed and combining a first half pattern with a second half pattern when keys mapped with the first half pattern and the second half pattern are consecutively pressed, thereby recognizing the combined patterns as a single alphabetic character.

In accordance with a second aspect of the present invention, there is provided a method for recognizing an alphabetic character inputted on a character input device having a key input section with a plurality of keys, said method comprising: a first step of setting a first key group with input keys mapped respectively with first half patterns of certain alphabetic characters which are each divided into a pair of half patterns; a second step of setting a second key group with input keys mapped with second half patterns of said certain alphabetic characters; a third step of mapping the other undivided alphabetic characters on the input keys of either the first key group or the second key group; and a fourth step of recognizing an input of an alphabetic character when a key mapped with the alphabetic character is pressed and combining a first half pattern with a second half pattern when keys mapped with the first half pattern and the second half pattern are consecutively pressed, thereby recognizing the combined patterns as a single alphabetic character.

BRIEF DESCRIPTION OF THE DRAWINGS

The above and other objects, features and advantages of the present invention will be more apparent from the following detailed description taken in conjunction with the accompanying drawings, in which:

FIG. 2 is a key mapping table for inputting alphabetic characters on a conventional mobile communication terminal;

FIG. 5 is a key mapping table for inputting alphabetic characters according to the present invention;

FIG. 6 is a table showing the keystroke sequence for inputting each alphabetic character according to the present invention.

DETAILED DESCRIPTION OF THE PREFERRED EMBODIMENTS

Figure 1:
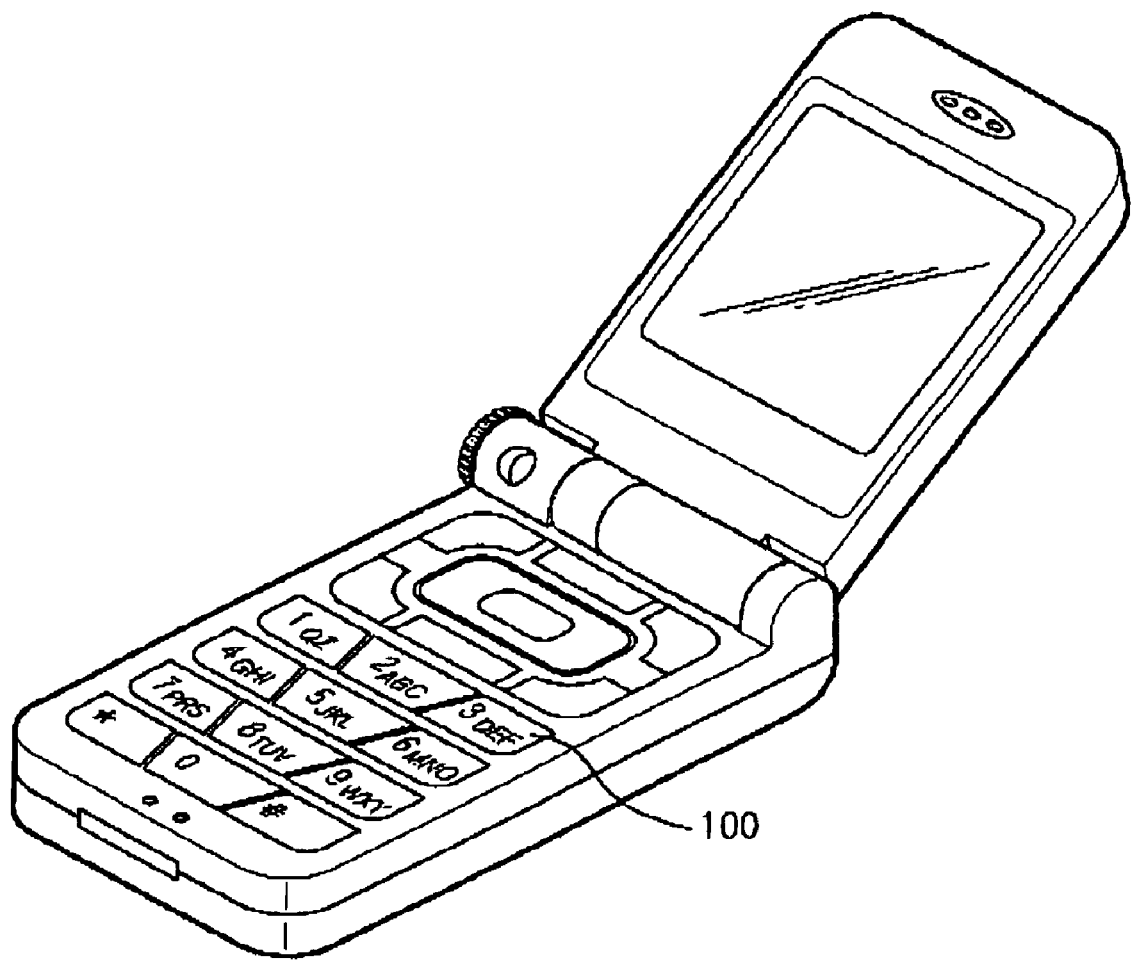
FIG. 1 is a perspective view of a key input section of a conventional mobile communication terminal.

Hereinafter, preferred embodiments of the present invention will be described in detail with reference to the accompanying drawings. In the drawings, the same element, although depicted in different drawings, will be designated by the same reference numeral or character. Although certain elements, such as a circuit device, are specifically defined in the following description of the present invention, it will be obvious to those skilled in the art that such definitions of elements are merely to improve understanding of the present invention and that the present invention can be carried out without such specific elements. Also, in the following description of the present invention, a detailed description of known functions and configurations incorporated herein is omitted to avoid making the subject matter of the present invention unclear.

Figure 3:
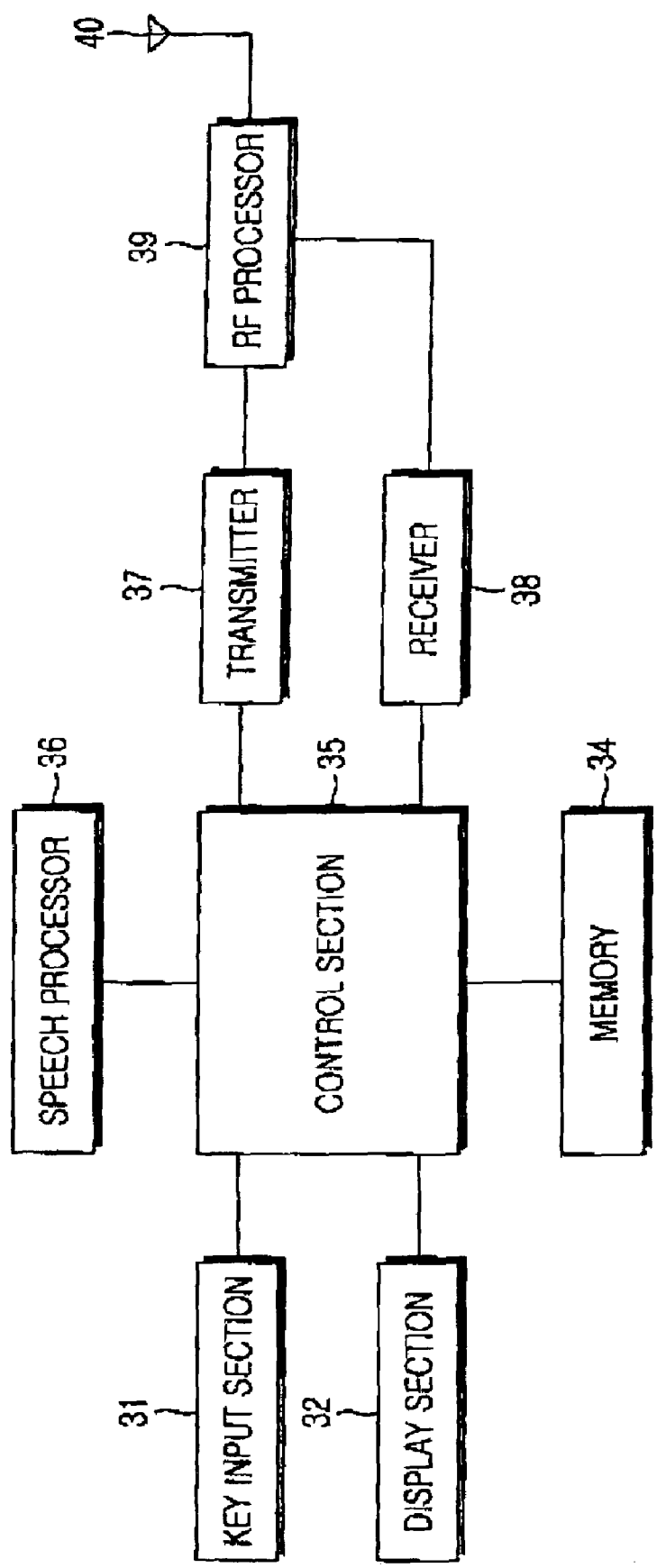
FIG. 3 is a block diagram of a mobile communication terminal according to the present invention.
Figure 4:
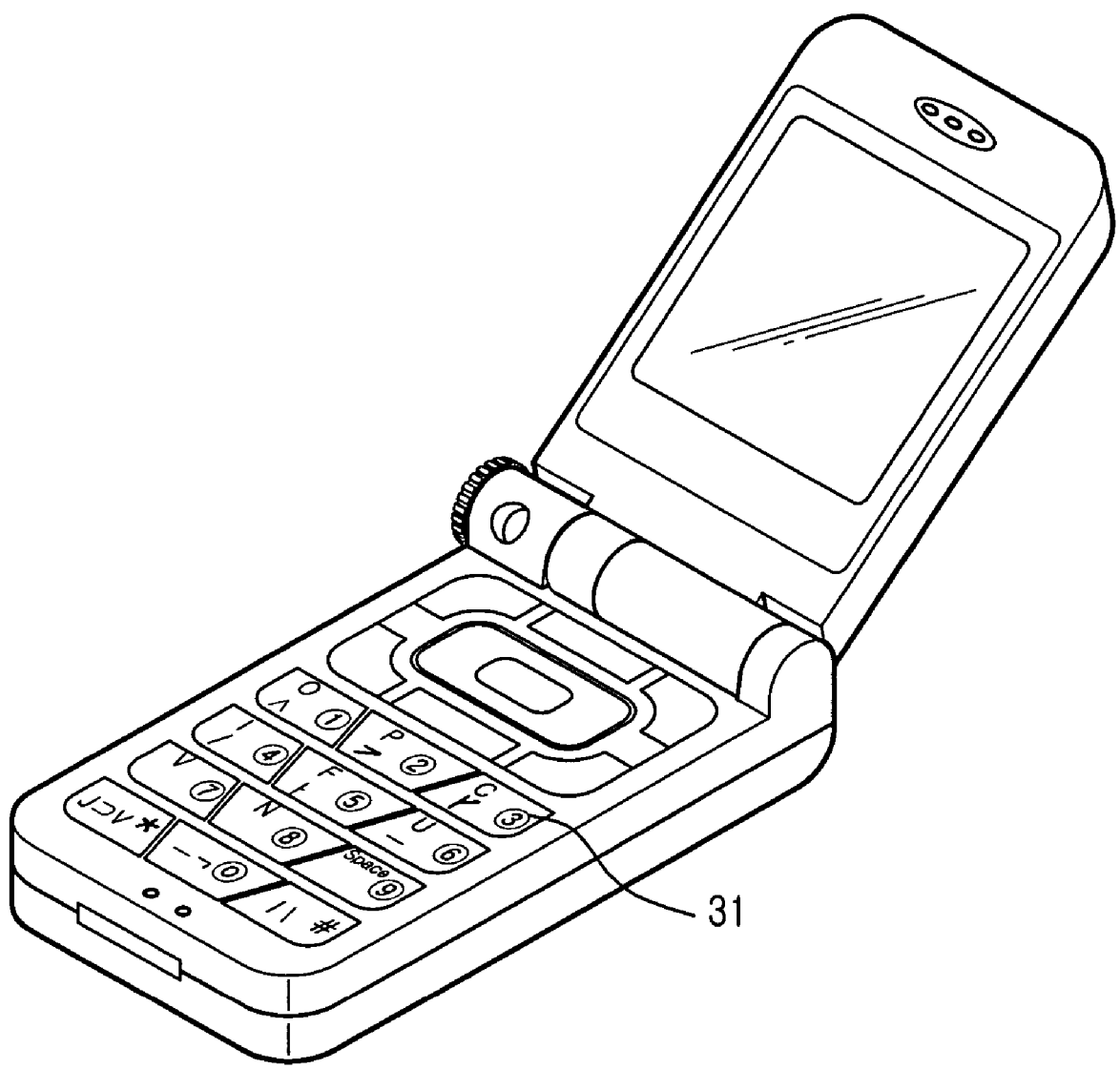
FIG. 4 is a perspective view of a mobile communication terminal having a character input device according to the present invention.
Figure 5:
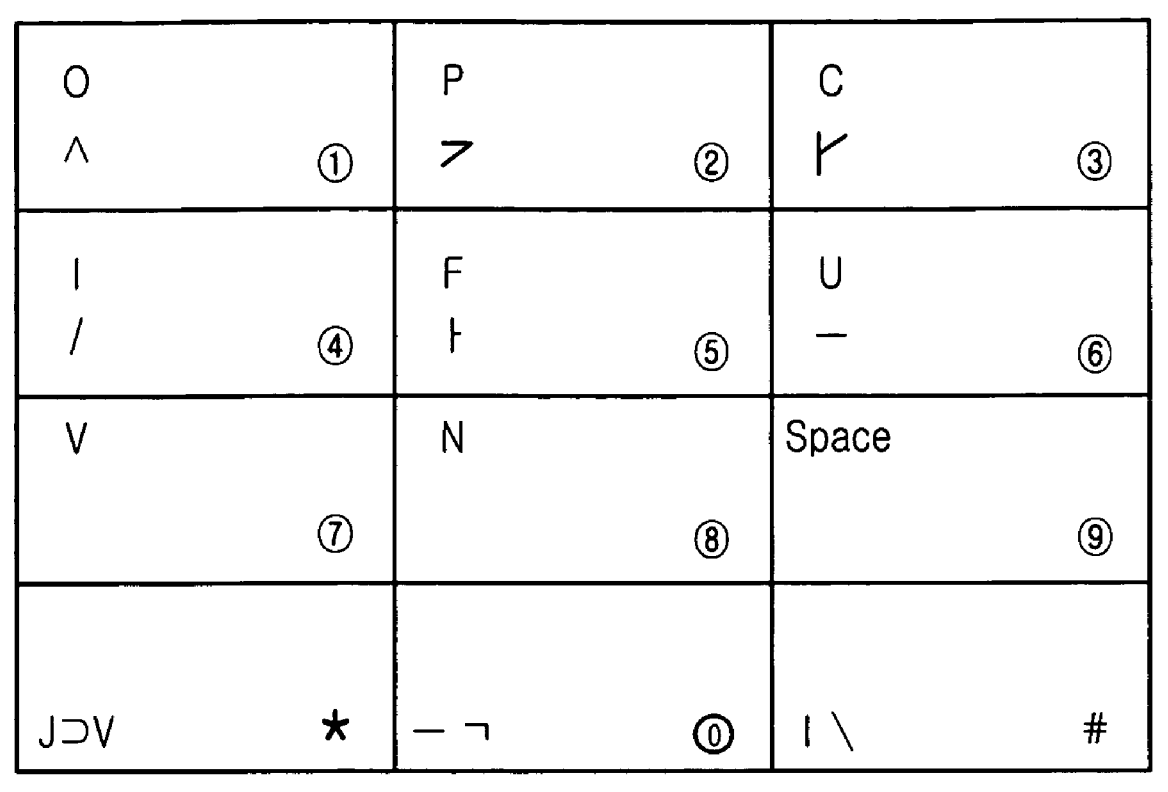

FIG. 3 is a block diagram of a mobile communication terminal according to the present invention. FIG. 5 is a key mapping table for inputting alphabetic characters according to the present invention. As shown in FIGS. 4 and 5, a key input section 31 has ten digit keys numbered 0 to 9, one of which is preferably set to be a space key. In addition to the ten numbered keys, the key input section preferably has two additional keys mapped respectively with symbols # and *.

According to a preferred embodiment of the present invention, the number key 1 is mapped with an alphabetic character O and a half pattern ˆ. The number key 2 is mapped with an alphabetic character P and a half pattern ⁊. The number key 3 is mapped with an alphabetic character C and a half pattern ୮. The number key 4 is mapped with an alphabetic character I and a half pattern /. The number key 5 is mapped with an alphabetic character F and a half pattern ┝. The number key 6 is mapped with an alphabetic character U and a half pattern -. The number key 7 is mapped with an alphabetic character V. The number key 8 is mapped with an alphabetic character N. The number key 9 is set up as a space key, typically for use between words. The * key is mapped with three half patterns J, ⊃ and v. The number key 0 is mapped with two half patterns _ and ⌐. The # key is mapped with two half patterns | and \.

In summary, the number keys 1 to 6 are each mapped with a half pattern and an alphabetic character which can be displayed by only one pressing of the corresponding key.

Also, the number keys 7 and 8 are each mapped with an alphabetic character which can be displayed by only one pressing of the corresponding key.

If the user consecutively presses any one of the number keys 1 to 6, each of which is mapped with a half pattern (hereinafter "first half patterns") and then presses one of the keys *, 0 and #, each of which are also mapped with other half patterns (hereinafter "second half patterns"), the two selected half patterns are combined to be inputted as a single alphabetic character.

FIG. 4 is a perspective view a mobile communication terminal having a character input device according to the present invention. Referring to FIGS. 3 and 4, the mobile communication terminal comprises a key input section 31 for user input, a display section 32 for graphic user interface, a speech processor 26 for processing speech data transmitted and received through a transmitter 37 and a receiver 38, an RF processor 39 for converting data into a high-frequency signal, a memory 34 and a control section 35 for controlling operations, such as speech or data transmission, of the mobile communication terminal.

The speech processor 36 digitally processes inputted or outputted analog speech data or analogly processes digital speech data stored in the memory 34 to output the processed data.

The transmitter 37 modulates an inputted signal to conform the inputted signal to the appropriate transmission type and sends the modulated signal to the RF processor 39. The RF processor 39 sends the signal outputted from the transmitter 37 to an antenna 40. The receiver 38 demodulates the received signal.

The display section 32 typically comprises an LCD (Liquid Crystal Display) unit and an LED.

The key input section 31 comprises twelve digit keys, a menu key and a send key. The twelve digit keys are ten number keys 0 to 9, a # key and a * key. According to the present invention, the number keys 1 to 6 are each mapped with one alphabetic character, which can be inputted by a single keystroke, and one half pattern, which are designated first half patterns in the preferred embodiment of the invention. The keys *, 9 and # are each mapped with a plurality of half patterns, which are designated second half patterns in the preferred embodiment of the invention and which are secondarily selected to be combined with a primarily selected first half pattern.

The memory 34 stores data (for example, SMS data) generated by the mobile terminal, character data for producing numbers, Korean or alphabetic characters and symbols mapped on each key of the key input section, and a mapping table (FIG. 5) for generating a single alphabetic character upon input of one or two keystrokes, according to the present invention.

When the user consecutively presses two keys mapped with different half patterns, the control section 35 combines the primarily selected half pattern with the secondarily selected half pattern based on the mapping table stored in the memory 34 of the key input section 31 in order to generate a single alphabetic character, which is then displayed on the display section 32. If the user consecutively presses one of the number keys 1 to 6 to select a first half pattern and presses one of the keys *, 0 and #, which are each mapped with a plurality of second half patterns, to complete an alphabetic character, the control section 35 will determine the most probable second half pattern to be combined with the selected first half pattern and will display the combined patterns as a single alphabetic character on the display section 32.

As the user consecutively presses two or more of the number keys 1 to 8, the corresponding alphabetic characters mapped on the pressed keys are displayed in sequence. However, when one of the number keys 1 to 6 are pressed and then one of the keys \*, 0 and # is pressed, the control section 35 will recognize a first half pattern mapped on one of the first pressed number keys 1 to 6. The control section 35 will combine the first half pattern with a second half pattern mapped on the pressed one of the keys \*, 0 and #. The control section 35 will then display the combined patterns as a complete alphabetic character on the display section 32.

FIG. 6 is a table showing a preferred the keystroke sequence for inputting each alphabetic character according to the present invention. Referring to FIG. 6, the user can input "A" by consecutively pressing the number keys 1 and 0 mapped respectively with a first half pattern Λ and a second half pattern -. The user can input "B" by consecutively pressing the number key 2 and the \* key. In order to input alphabetic character "C," "F," "I," "S," "O," "P," "U" or "V," the user need only press the corresponding number key once.

To further illustrate a preferred embodiment of the present invention, the user can input the letter "D" by consecutively pressing the number key 4 and the \* key, which are mapped respectively with a first half pattern I and a second half pattern ⊃. Also, the user can input "K" by consecutively pressing the number key 3 and the # key mapped respectively with a first half pattern ┌ and a second half pattern \. Any other alphabetic character divided into a pair of half patterns can be inputted in the same manner based on the mapping table for inputting alphabetic characters.

Figure 7:
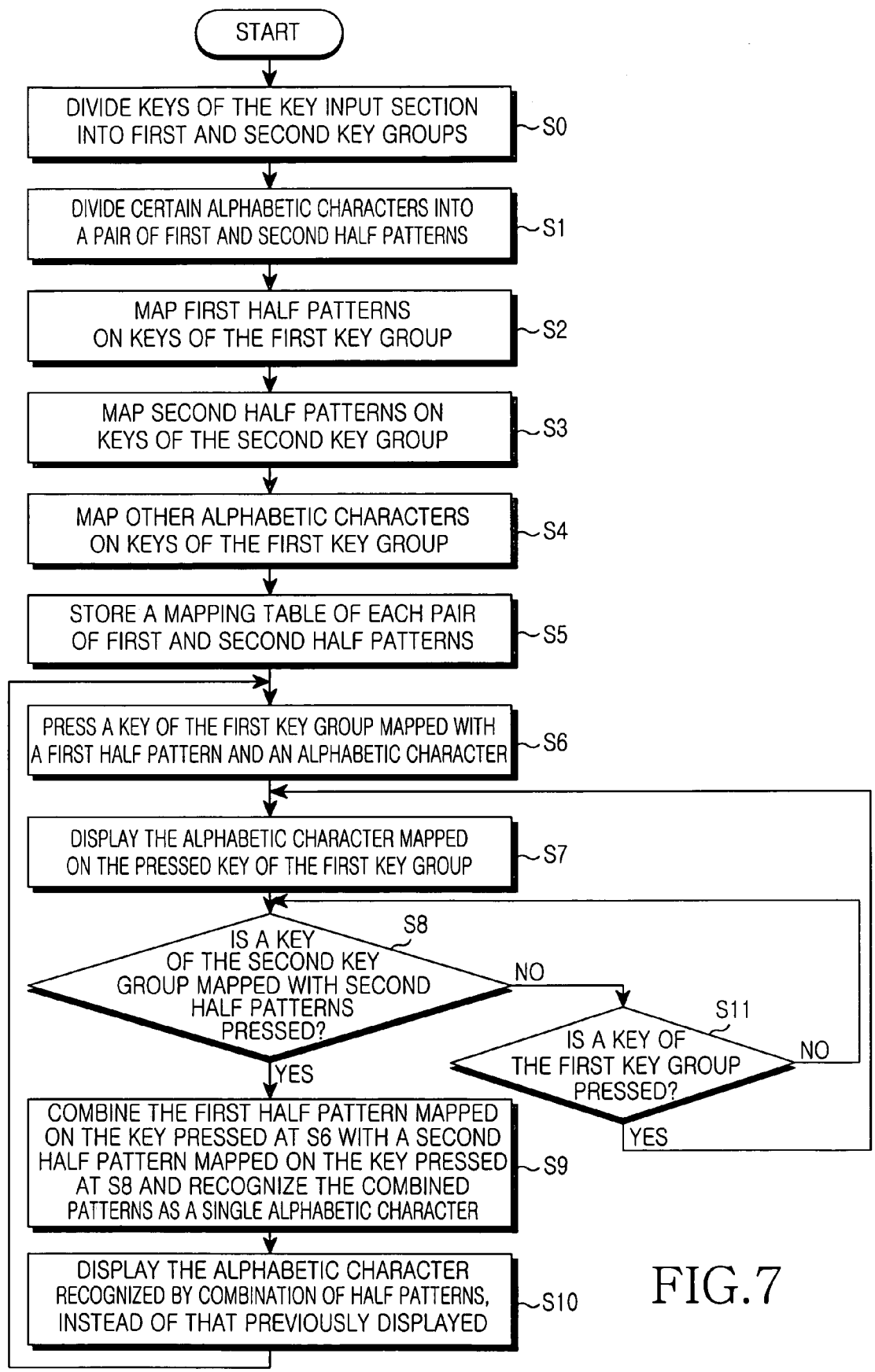
FIG. 7 is a flow chart showing a process of recognizing an alphabetic character inputted on a mobile communication terminal according to the present invention.

FIG. 7 is a flow chart showing a process for recognizing an alphabetic character inputted on a mobile communication terminal according to the present invention. The control section 35 has software for recognizing alphabetic characters inputted by pressing corresponding keys of the key input section 31 in the sequence shown in FIG. 7. At step 0, the control section 35 divides the input keys of the key input section 31 into a first key group and a second key group.

At step 1, the control section 35 divides certain alphabetic characters each into a pair of half patterns, i.e., a first half pattern and a second half pattern. All the pairs of first and second half patterns for inputting alphabetic characters are shown in the key mapping table of FIG. 5. At step 2, the control section 35 maps the first half patterns on the keys of the first key group. Also, at step 3, the control section 35 maps the second half patterns on the keys of the second key group. At step 4, the control section 35 maps undivided alphabetic characters on the keys of the first key group. At step 5, the control section 35 stores a mapping table of each pair of first and second half patterns in the memory 34. When the number of half patterns is greater than that of the keys of the second key group, the control section 35 may map a plurality of half patterns on each key of the second key group and will accordingly store the plurality of half patterns in the memory 34.

If the user presses a key of the first key group which is mapped with one alphabetic character and one first half pattern at step 6, the mapped alphabetic character will be displayed on the display section 32 at step 7. If the user subsequently presses a key of the second key group which is mapped with a plurality of second half patterns at step 8, the control section 35 will combine a first half pattern mapped together with an alphabetic character on the key pressed at step 6 with one of the second half patterns on the key pressed at step 8 and will recognize the combined patterns as a single complete alphabetic character based on the key mapping table of FIG. 5 at step 9.

At step 10, the control section 35 replaces the alphabetic character previously displayed at step 7 with that recognized by the combination of patterns. In other words, the control section 35 displays the alphabetic character recognized by the combination of patterns, instead of the alphabetic character displayed at step 7. Then, the control section 35 returns to step 6 and waits for the input of a new alphabetic character. Although not shown in FIG. 7, in a case where a plurality of second half patterns are mapped on each key of the second key group, it is preferable to select the most probable second half pattern which can be combined with the previously inputted first half pattern.

If the user presses a key of the first key group, the control section 35 will display an alphabetic character mapped on the key at step 7. If another key on the first key group is determined at step 11 to have been pressed, the control section 35 will return to step 7 and will display an alphabetic character mapped on the pressed key on the display section 32. Whenever a key is pressed, the control section 35 recognizes an alphabetic character through steps 7 to 11 and sequentially displays the recognized character on the display section 32.

As described above, a character input device having a plurality of number keys maps half patterns on the keys for generating a single alphabetic character by one or two keystrokes. The user can input any desired alphabetic character by only one or two keystrokes. Further, the present invention allows the user to enter of any of letters "C," "F," "I," "N," "O," "P," "U" or "V" without time delay associated with conventional systems and methods.

Although the preferred embodiments explained above apply a character input device according to the present invention to a mobile communication terminal, the character input device is equally applicable to a computer keyboard, a line telephone set, an ATM (automated teller machine) or the like.

In the preferred embodiments, each key of the character input device is mapped with one alphabetic character and/or one or more half characters. Based on the above disclosure, one of skill in the art will, however, recognize that it is also possible to map each key only with half patterns.

In addition to the preferred embodiments of the present invention that have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An alphabetic character input device comprising:
   a key input section comprising a first key group having input keys mapped with first half patterns of certain alphabetic characters which are each divided into a pair of half patterns and, a second key group having input keys mapped with second half patterns of said certain alphabetic characters, and undivided alphabetic characters are mapped on input keys of either the first or second key groups;
   a memory for storing a table that maps the input keys of the first and second key groups with the first and second half patterns of said certain alphabetic characters and said undivided alphabetic characters; and
   a control section for recognizing an input of an alphabetic character when a key is pressed that was mapped with one of the undivided alphabetic characters, and for combining first and second half patterns when keys mapped with the first and second half patterns are consecutively pressed, thereby recognizing the combined patterns as a single alphabetic character.

2. The alphabetic character input device according to claim 1, wherein each input key of the first key group is mapped with one of alphabetic characters O, P, C, I, F, U, V and N, each input key of the first key group is further mapped with one of first half patterns Λ, ᄀ, ᄂ, /, ㅏ and -, and each input key of the second key group is mapped with at least one of second half patterns J, ⊃, v, —', ¬, | and \.

3. The alphabetic character input device according to claim 2, wherein said control section recognizes input of a key mapped with two or more second half patterns, following a primary selection of a key mapped with a first half pattern, as an input of a most probable second half pattern which can be combined with the first half pattern.

4. The alphabetic character input device according to claim 1, wherein one of said input keys has a space function.

5. A method for recognizing an alphabetic character inputted on an alphabetic character input device having a key input section with a plurality of keys, which comprises:

mapping a first key group among said plurality of input keys with first half patterns of certain alphabetic characters which are each divided into a pair of half patterns;

mapping a second key group among said plurality of input keys with second half patterns of said certain alphabetic characters;

mapping undivided alphabetic characters on input keys of either the first or second key groups;

recognizing an input of an alphabetic character when a key mapped with one of the undivided alphabetic characters is pressed; and combining a first half pattern with a second half pattern when keys mapped with first and second half patterns are consecutively pressed, thereby recognizing the combined patterns as a single alphabetic character.

6. The method according to claim 5, further comprising recognizing input of a key mapped with two or more second half patterns, following a primary selection of a key mapped with a first half pattern, as an input of a most possible second half pattern which can be combined with the first half pattern.

* * * * *